3,453,296
Δ¹-7α-METHYL-ANDROSTENES
Albert Wettstein, Riehen, and Georg Anner, Ludwig
 Ehmann, and Peter Wieland, Basel, Switzerland, as-
 signors to Ciba Corporation, New York, N.Y., a cor-
 poration of Delaware
No Drawing. Continuation-in-part of application Ser. No.
 355,093, Mar. 26, 1964. This application Oct. 21, 1966,
 Ser. No. 588,287
Claims priority, application Switzerland, May 6, 1963,
 5,674/63
Int. Cl. C07c 169/10, 169/22; A61k 17/06
U.S. Cl. 260—397.4                            9 Claims

ABSTRACT OF THE DISCLOSURE

Δ¹-3-oxo-7α-methylandrostenes and -19-norandrostenes of the general formula

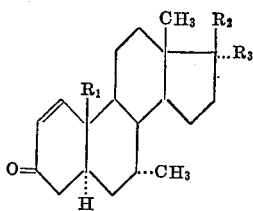

where $R_1$ stands for a hydrogen atom or a methyl group, $R_2$ for a free or esterified hydroxyl group, $R_3$ for a hydrogen atom, or a lower alkyl, lower alkenyl or lower alkinyl radical which may be halogenated, and $R_2$ and $R_3$ together represent a free or protected oxo group. The compounds of the invention are useful, inter alia, as ovulation inhibitors.

---

This is a continuation-in-part application of our application Ser. No. 355,093, filed Mar. 26, 1964 (now abandoned).

The present invention relates to the manufacture of Δ¹-3-oxo-7α-methylandrostenes and -19-norandrostenes of the general formula (I)

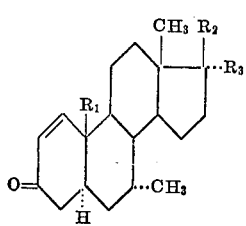

where $R_1$ stands for a hydrogen atom or a methyl group, $R_2$ for a free or esterified hydroxyl group, $R_3$ for a hydrogen atom, or a lower alkyl, lower alkenyl or lower alkinyl radical which may be halogenated, and $R_2$ and $R_3$ together represent a free or protected oxo group.

There may be mentioned more especially those Δ¹-7α-methyl-5α-androstenes and 19-nor-5α-androstenes of the Formula I in which $R_2$ represents a hydroxyl or acyloxy group and in which the acid residues are those of aliphatic, alicyclic, araliphatic or heterocyclic carboxylic acids with 1 to 18 carbon atoms, and $R_3$ stands for a hydrogen atom or for an alkyl, alkenyl or alkinyl group with 1 to 4 carbon atoms. The acid residues referred to may be, for example, residues of formic, acetic, propionic acid, a butyric or valeric (such as n-valeric) acid, of trimethylacetic, a caproic (such as β-trimethylpropionic acid) or diethylacetic acid, of oenanthic, caprylic, pelargonic, capric acid, an undecylic acid, for example undecylenic acid, of lauric, myristic, palmitic or stearic acids, for example, of oleic, cyclopropyl-, -butyl-, pentyl- or -hexyl-carboxylic acid, cyclopropyl-methylcarboxylic, cyclobutyl-methyl-carboxylic, cyclopentyl-ethylcarboxylic, cyclohexyl-ethyl-carboxylic acid, of cyclopentyl-, cyclohexyl- or phenyl-acetic or -propionic acids, of benzoic acid, phenoxyalkane acids such as phenoxyacetic, parachlorophenoxyacetic, 2:4-dichloro-phenoxy-acetic, 4-tertiary-butyl-phenoxyacetic, 3-phenoxypropionic, 4-phenoxybutyric acid, of furan-2-carboxylic, 5-tertiary butyl furan-2-carboxylic, 5-bromo-furan-2-carboxylic acid, of nicotinic acids, β-ketocarboxylic acids, for example of the acetoacetic, propionylacetic, butyrylacetic or caprinoylacetic acid, of aminoacids, such as diethylaminoacetic or aspartic acid or the like. Instead of residues of carboxylic acids there may be used also those of sulphonic acids, or of phosphoric, sulphuric or hydrohalic acids.

As examples of the above mentioned lower aliphatic hydrocarbon residues there may be mentioned alkyl, alkenyl and alkinyl groups such as a methyl, ethyl, isopropyl, vinyl, allyl, methallyl, ethinyl or propinyl group, or corresponding halogenated groups, for example the trifluoropropinyl group.

These new steroids of the above formula that contain in position 17 a hydrocarbon radical, more especially a methyl group or an unsaturated hydrocarbon radical and especially those of the 19-nor-series, further act as gestagens and also show a marked inhibitory action on the production of pituitary gonadotrophins and can thus be used e.g. as ovulation inhibitors. An especially good anti-gonadotrophic action is shown by the Δ¹-3-oxo-7α,17α-dimethyl-17β-hydroxy-19-nor-5α-androstene.

The new compounds are accessible by conventional methods. Thus, for example, in the 1:2-saturated-3-oxo-compounds corresponding to those of the Formula I the double bond can be introduced in known manner into the 1:2-position, if desired, in any order of sequence, in a resulting compound containing a 17-oxo group this group may be converted (if desired with temporary protection of the 3-oxo group) into a hydroxyl group, if desired while at the same time introducing a lower aliphatic hydrocarbon radical in 17α-position and, if desired, any hydroxyl groups present may be dehydrogenated, esterified or etherified in the conventional manner, and/or any esterified or etherified hydroxyl groups or protected oxo groups may be liberated.

According to another process the 3-hydroxyl group in Δ¹-3-hydroxysteroids of the Formula I may be oxidised to a keto group in the conventional manner, and, if desired, the same further optional steps as in the above described process are carried out.

The introduction according to the invention of the double bond in the 1:2-position of the steroid is achieved, for example, by dehydrogenating a corresponding saturated 3-oxo-compound with selenium dioxide or selenous acid or a derivative thereof; alternatively by reacting the identical starting material with a quinone having a dehydrogenating action, more especially with 2:3-dicyano-5:6-dichlorobenzoquinone or tetracyanobenzoquinone. A particularly advantageous way of introducing the double bond is bromination of the saturated 3-oxo compound followed by dehydrobromination of the 2-bromosteroid formed. Solvents, preferably used for the dehydrogenation with selenium dioxide or with the said quinones, are alcohols, more especially tertiary alcohols such as tertiary butanol or tertiary amyl alcohol, also ethers such as ethyl ether, tetrahydrofuran and dioxane, also aromatic hydrocarbons such as benzene or toluene.

The bromination in position 2 of the 3-oxosteroids is advantageously performed according to this invention by treatment with bromine in a suitable solvent, such as a lower aliphatic acid, for example acetic or propionic acid, a halogenated hydrocarbon, for example carbon tetrachloride, chloroform or methylene chloride, or dimethylformamide. The bromination can also be achieved with N-bromo-amides or -imides, such as N-bromo-succinimide or N-bromo-acetamide. Particularly good yields of 2-bromosteroids are obtained by reacting the starting materials with the complex or pyridine-hydrobromide and bromine, for example in methylene chloride or chloroform.

The dehydrobromination may follow the usual practice and consists, for example, in heating the 2-bromo compound with an organic base, such as picoline, lutidine, collidine or quinoline, or preferably by reaction with a lithium halide, such as lithium chloride or bromide, if desired in the presence of an inorganic base, such as lithium carbonate, for example in dimethylformamide or dimethylacetamide.

It has been found advantageous to purify the $\Delta^1$-3-oxocompounds by treating the crude product formed, for example in methanol, with sodium pyrosulphite at room temperature (to remove any unreacted saturated 3-ketone) and then at an elevated temperature, whereby the $\Delta^1$-steroid is separated from its $\Delta^4$-isomer (which does not react with pyrosulphite) and is then obtained in the pure form after a basic treatment of the sulphonated compound. To remove small amounts of by-products it is also possible to use chromatography on alumina.

When the 17-position is occupied by a protected oxo group, for example a ketal group or an enolether grouping, it is advantageously liberated, after formation of the 1:2-double bond or after dehydrogenation of a 3-hydroxyl group, preferably by treatment with a dilute acid, for example by heating with dilute acetic acid or by reaction with an alkanone, such as acetone, in the presence of an acidic catalyst, such as para-toluenesulphonic acid.

The temporary protection of the 3-oxo group as one of the optional steps described above, can be achieved, for example, in the conventional manner by ketalisation or conversion into an enol derivative, for example into an enolether such as methyl or ethyl ether or into an enamine. Thus, for example, the 3-oxo-group in a $\Delta^1$-3:17-dioxo-7$\alpha$-methyl-5$\alpha$-androstene obtained by the present process is protected in the following manner: The compound is converted in the known manner into the $\Delta^1$-3-oxo-7$\alpha$-methyl-17$\beta$-hydroxy-17$\alpha$-cyano-5$\alpha$-androstene by reaction with hydrocyanic acid or a lower aliphatic cyanohydrin such as acetone- or methylethylketone-cyanohydrin (owing to the selective attack of the said reagents on the 17-carbon atom), whereupon enolisation and etherification (for example with orthoformic acid ethyl ester) in position 3 are performed in the known manner. The cyanohydrin grouping is then split in the known manner, for example by treatment with a basic agent, with regeneration of the 17-oxo group. The protected 3-oxo group can be liberated again in the known manner at a later stage, for example after introduction of a lower aliphatic hydrocarbon residue in position 17$\alpha$, by treatment with an acidic agent.

Conversion of the 17-oxo group into a 17-hydroxyl-group can be carried out by treatment with a complex metal hydride, for example sodium or potassium borohydride, lithium-aluminium hydride or lithium trialkoxy aluminium hydride such as lithium tri-tetriary butoxy aluminium hydride, in a solvent that is stable towards the reducing agent, for example, in an ether such as diethyl ether, tetrahydrofuran or dioxane, or in a hydrocarbon such as benzene or toluene, or by treatment with an organo-metal compound, for example a Grignard compound or an alkali metal- or alkaline earth metal-alkyl, -alkenyl or -alkinyl compound, while simultaneously introducing in position 17$\alpha$ the corresponding hydrocarbon radicals such as methyl, ethyl, vinyl, allyl, methallyl, ethinyl or propinyl groups. When 3-oxo compounds are reacted with the said organo-metal compounds, 3-substituted 3-hydroxysteroids may also be formed as by-products.

The acylation or etherification of the 17-hydroxy compounds formed is carried out in the conventional manner, for example for the esters by reaction with acid halides or anhydrides of the corresponding acids, preferably in the presence of a base, such as pyridine; in the case of the ethers by treatment with a reactive, esterified lower alkanol, cycloalkanol or aralkanol, such as the hydrohalic or sulphonic acid esters thereof, in the presence of a base such as an alkali metal bicarbonate, carbonate or hydroxide. If it is desired to liberate esterified or etherified hydroxyl groups, this is likewise performed in the conventional manner.

The conversion of a hydroxyl group into an oxo group, more especially in the process described above starting from $\Delta^1$-3-hydroxysteroids, is performed in the known manner, for example by reaction with compounds of hexavalent chromium, such as chromium trioxide or potassium bichromate, or of tetravalent manganese, such as manganese dioxide, or by the Oppenauer method, such that is to say by reacting the hydroxysteroids with a ketone, such as acetone, cyclohexanone or benzophenone, in the presence of a catalyst, such as potassium tertiary butylate or aluminium isopropylate. The last-mentioned method is particularly advantageously applied to the oxidation of $\Delta^1$-3-hydroxysteroids to $\Delta^1$-3-oxosteroids.

The invention includes also any modification of the process in which an intermediate obtained at any stage of the process is used as starting material and any remaining steps are carried out, or the process is discontinued at any stage, thereof, or in which a starting material is formed under the reaction conditions or is used in the form of a hydrate or salt thereof.

As specific compounds coming within the scope of the present invention as being of particular importance are the following: $\Delta^1$-3-oxo - 7$\alpha$-methyl - 17$\beta$-hydroxy-5$\alpha$-androstene and its esters, such as the acetate, the propionate, the trimethylacetate, the valerates, the butyrates, the oenanthate, the decanoate, the undecanoate, the undecenoate, the phenylpropionate, the benzoate or hexahydrobenzoate, $\Delta^1$-3-oxo - 7$\alpha$,17$\alpha$-dimethyl - 17$\beta$-hydroxy - 5$\alpha$-androstene, $\Delta^1$-3-oxo - 7$\alpha$-methyl 17$\alpha$-ethinyl - 17$\beta$-hydroxy - 5$\alpha$-androstene, the $\Delta^1$-3-oxo - 17$\alpha$-methyl - 17$\alpha$-propinyl - 17$\beta$-hydroxy - 5$\alpha$-androstene, $\Delta^1$-3-oxo-7$\alpha$-methyl - 17$\alpha$-ethyl-17$\beta$-hydroxy - 5$\alpha$-androstene and their esters, for instance those named above and the 19-nor-derivatives of all these compounds.

Another object of this invention are the 1:2-saturated-3-oxo - 7$\alpha$-methyl - 5$\alpha$-steroids corresponding to the Formula I, which are used as starting materials in the processes described above. They are advantageously prepared from the corresponding $\Delta^4$-3-oxo-compounds, some of which are already known, by saturation of the $\Delta^4$-double bond. This reduction can be carried out, for example by catalytic hydrogenation or by reduction with an alkali or alkaline earth metal, such as lithium, sodium, potassium or calcium, in liquid ammonia or in an aliphatic amine, for example in ethylamine. The $\Delta^4$-3-oxo-7$\alpha$-methylandrostenes and -19-norandrostenes can be prepared with advantage, for example, from 7-unsubstituted $\Delta^5$-3-hydroxy compounds by an Oppenauer oxidation, dehydrogenation to form the $\Delta^{4,6}$-3-oxosteroids, for example with chloranil, and by subsequent treatment with methyl magnesium bromide in the presence of a copper salt.

As mentioned above, the compounds of the present invention can also be manufactured from compounds corresponding to Formula I in which however there is a 3-hydroxyl group instead of the oxo group by dehydrogenating the former to an oxo group in a manner known in the art. The said 3-hydroxy-starting materials can be manufactured preferably by the process disclosed in applicants' patent application Ser. No. 355,099, filed Mar. 26, 1964 (now U.S. Patent No. 3,264,287) for example by reduction of $\Delta^1$-3-oxosteroids of the Formula I with complex light-metal hydrides, such as tri-tertiary butoxy-lithium aluminum hydride, sodium borohydride or lithium aluminum hydride.

This process is advantageous when compounds of Formula I are to be prepared in which an unsaturated hydrocarbon is present in 17-position which may be partly affected by a treatment with bromine according to the first process described above: in such a case $\Delta^1$-3-hydroxy - 17-oxo - 7$\alpha$-methyl - 5$\alpha$-androstene compound is chosen as starting material, the 17-unsaturated hydrocarbon radical is introduced in known manner and the 3-oxo group is then formed by oxidation in known manner. Thus, for example, reduction of $\Delta^1$-3-oxo - 7$\alpha$-methyl - 17-ethylenedioxy-5$\alpha$-androstene (which itself is accessible from $\Delta^5$-3-hydroxy-17-oxoandrostene by ketalisation, followed by Oppenauer oxidation, dehydrogenation in position 6:7, introduction of the 7$\alpha$-methyl group, saturation of the $\Delta^4$ double bond and introduction of the $\Delta^1$ double bond) according to the above identified patent application, followed by hydrolysis of the 17-ketal grouping, yields $\Delta^1$-3-hydroxy-7$\alpha$-methyl-17-oxo-5$\alpha$-androstene, in which the 17$\beta$-hydroxy-17$\alpha$-allyl grouping can be formed, for example by reaction with allyl magnesium bromide, or the 17$\beta$-hydroxy-17$\alpha$-ethinyl-grouping by reaction with lithium acetylide. The mild oxidation according to the present process, for example the Oppenauer oxidation, finally gives rise to $\Delta^1$-3-oxo-7$\alpha$- methyl - 17$\beta$-hydroxy - 17$\alpha$-allyl- or -17$\alpha$-ethinyl - 5$\alpha$-androstene respectively.

The present invention includes also mixtures for use in human or veterinary medicine which contain the said $\Delta^1$-3-oxo-7$\alpha$-methylandrostenes or -19-norandrostenes in conjunction or admixture with a solid or liquid pharmaceutical excipient. The mixtures are prepared in the conventional manner, for example with the use of organic or inorganic pharmaceutical excipients suitable for parenteral, enteral or local administration. Suitable excipients are substances that do not react with the products of the present process, for example water, vegetable oils, benzyl alcohols, polyethyleneglycols, gelatine, lactose, starches, magnesium stearate, talcum, white petroleum jelly, cholesterlo or other medicinal excipients. There are manufactured more especially preparations for parenteral administration, preferably solutions, above all oily or aqueous solutions, or suspensions, emulsions or depot preparations; for enteral administration there are further manufactured tablets or dragees and for local application also ointments or creams. The preparations may be sterilised or they may contain assistants, such as preserving, stabilising, wetting or emulsifying agents, salts for regulating the osmotic pressure or buffers. The content of the active substance in these preparations per unit dosage such as of a tablet, is preferably 0.1–50 mg. or 0.03–60%.

The following examples illustrate the invention.

Example 1

3.03 g. of 3-oxo-7$\alpha$:17$\alpha$-dimethyl-17$\beta$-hydroxy-5$\alpha$-androstane are dissolved with stirring in 70 g. of dimethylformamide. 0.3 ml. of aqueous hydrobromic acid of 48% strength and 0.06 g. of para-toluenesulphonic acid monohydrate are then added, and a solution of 0.5 ml. of bromine in 14.5 ml. of dimethylformamide is run in within 10 minutes at an internal temperature of 20–25° C. After 3 hours all bromine has been consumed. 4 g. of lithium carbonate are then added, and the batch is heated for 2½ hours under nitrogen at the boil. The reaction mixture is cooled and then introduced into 300 ml. of 2 N-hydrochloric acid, extracted with ether, and the extract is successively washed with 2 N-hydrochloric acid, water, 2 N-sodium carbonate solution and water. The extract is dried over sodium sulphate, filtered and evaporated. The residue is dissolved in 160 ml. of methanol. A solution of 6 g. of sodium pyrosulphite in 30 ml. of water is then run in at 20–25° C. and the whole is stirred for 5 minutes, and then extracted with 4× 100 ml. of methylene chloride. The extracts are washed with 3× 50 ml. of water, dried over sodium sulphate, filtered, combined and evaporated. The residue (2.66 g.) is dissolved in 160 ml. of methanol and stirred for 5 minutes at 20 to 25° C. with a solution of 6 g. of sodium pyrosulphite in 30 ml. of water. The solution is extracted with methylene chloride as described above, and the extract is washed with water, dried and evaporated. The residue (2.26 g.) is dissolved in 160 ml. of methanol, a solution of 6 g. of sodium pyrosulphite in 30 ml. of water is added, and the reaction solution is heated at the boil for 16 hours under nitrogen, then cooled and extracted with 4× 100 ml. of methylene chloride. The extracts are successively washed with 3× 50 ml. of water. The aqueous phase of the methylene chloride extraction and the washings are combined and rendered alkaline to phenolphthalein with 20 ml. of concentrated sodium hydroxide solution. The whole is extracted with 4× 100 ml. of methylene chloride, the extracts are washed with 3× 50 ml. of water, dried over sodium sulphate, filtered and evaporated. The residue (1.59 g.) is recrystallized from ether and yields 1.0 g. of $\Delta^1$-3-oxo-7$\alpha$: 17$\alpha$-dimethyl-17$\beta$-hydroxy-5$\alpha$-androstene melting at 174–175° C. Optical rotation $[\alpha]_D^{20°}=-1°$ (c.=1% in dioxane). $\lambda_{max}$. (in rectified spirit): 230 m$\mu$, $\epsilon$=10,900.

To manufacture the starting material (3-oxo-7$\alpha$-dimethyl-17$\beta$-hydroxy-5$\alpha$-androstane) 2.4 g. of lithium (finely cut up wire) are dissolved with stirring, under a current of dry nitrogen, at −70° C. in 1 litre of liquid ammonia. The resulting dark-blue solution is stirred on for 60 minutes at −70° C. In the course of 5 to 10 minutes a solution of 10.0 g. of $\Delta^4$-3-oxo-7$\alpha$:17$\alpha$-dimethyl-17$\beta$-hydroxy-androstene in 100 ml. of dioxane and 100 ml. of ether is run in, rinsing being performed with 100 ml. of ether. The blue solution is stirred on for 60 minutes at −70° C. under nitrogen. In the course of 20 minutes 40 g. of finely powered, dry ammonium chloride are then added portionwise; the batch froths, the blue colour disappears, and a milky white suspension forms. The ammonia is evaporated by gradual thawing. The residue is taken up in ether and water, and the isolated ether extract is repeatedly washed with water, dried over sodium sulphate and evaporated. Yield: 11.0 g. of crystalline, crude 3-oxo-7$\alpha$,17$\alpha$-dimethyl-17$\beta$-hydroxy - 5$\alpha$ - androstane which, substantially, does not absorb in ultraviolet light at 243–244 m$\mu$.

For purification the resulting crude product (11.0 g.) is taken up in 240 ml. of methanol, mixed with a solution of 24 g. of sodium pyrosulphite in 200 ml. of water, and the whole is stirred for 15 minutes at 20–25° C. and then extracted with 4× 125 ml. of methylene chloride. The extracts are washed with 3× 75 ml. of water. The aqueous phase of the methylene chloride extraction and the 3 washings are combined and rendered alkaline to phenolphthalein with 80 ml. of concentrated sodium hydroxide solution. The whole is extracted with 4× 150 ml. of methylene chloride, and these extracts are washed with 3× 125 ml. of water, dried over sodium sulphate, filtered, combined and evaporated. The residue (8.5 g. of white crystals) is recrystallised from ether and yields 5.8 g. of 3-oxo-17$\alpha$:17$\alpha$-dimethyl - 17$\beta$ - hydroxy - 5$\alpha$ - androstane melting at 148–149° C. Optical rotation $[\alpha]_D=-17°$ (c.=1% in dioxane).

Example 2

A solution of 3.0 g. of 3-oxo-7$\alpha$-methyl-17$\beta$-hydroxy-5$\alpha$-androstane in 100 ml. of dimethylformamide is mixed with 0.07 g. of para-toluenesulphonic acid monohydrate and 0.3 ml. of aqueous hydrobromic acid of 48% strength, and in the course of 10 minutes a solution of 0.5 ml. of bromine in 15 ml. of dimethylformamide is run in at an internal temperature of 20–25° C. After 3 to 4 hours free bromine can no longer be identified in the reaction mixture, whereupon 4 g. of lithium carbonate are added. The batch is heated for 3 hours at the boil under nitrogen. The reaction mixture is cooled and added to 300 ml. of 2 N-hydrochloric acid, extracted with ether, and the extract is washed successively with 2 N-hydrochloric acid, water, 2 N-sodium carbonate solution and water. The extract is dried over sodium sulphate, filtered and evaporated. The residue is dissolved in 160 ml. of methanol, mixed with a solution of 6 g. of sodium pyrosulphite in 30 ml. of water, stirred for 5 minutes at an internal temperature of 20 to 25° C., and extracted with 4× 100 ml. of methylene chloride. The methylene chloride extracts are washed with 3× 50 ml. of water (if desired with addition of a small amount of saturated sodium chloride solution), dried over sodium sulphate, filtered and evaporated. The residue (2.7 g.) is dissolved in 160 ml. of methanol and stirred for 5 minutes at 20–25° C. with a solution of 6 g. of sodium pyrosulphite in 30 ml. of water. The solution is extracted with methylene chloride as described above, and the extract is washed with water (if desired with addition of a small amount of saturated sodium chloride solution), dried over sodium sulphate, filtered and evaporated. The residue (2.0 g.) is dissolved in 160 ml. of methanol, a solution of 6 g. of sodium pyrosulphite in 30 ml. of water is poured in, and the reaction solution is heated under nitrogen for 20 hours at the boil, then cooled, and extracted with 4× 100 ml. of methylene chloride. The methylene chloride extracts are washed with 3× 50 ml. of water containing a small amount of saturated sodium chloride solution. The aqueous phase of the methylene chloride extraction and the washings are combined and rendered alkaline to phenolphthalein with 20 ml. of concentrated sodium hydroxide solution, extracted with 4× 100 ml. of methylene chloride, and these extracts are washed with 3× 50 ml. of water, dried over sodium sulphate, filtered and evaporated. The residue is crystallised from ether, to yield 0.9 g. of $\Delta^1$-3-oxo-7$\alpha$-methyl - 17$\beta$ - hydroxy-5$\alpha$-androstene melting at 147–149° C. Optical rotation $[\alpha]_D^{20°} = -10°$ (c.=1% in dioxane). $\lambda_{max}$. (rectified spirit): 229 to 230 m$\mu$, $\epsilon$=10,500.

To manufacture the starting material, 2.4 g. of lithium are dissolved in 1 litre of liquid ammonia at −70° C. with stirring under nitrogen. A solution of 10.0 g. of $\Delta^4$-3-oro-7$\alpha$-methyl-17$\beta$-hydroxyandrostene in 100 ml. of dioxane and 100 ml. of ether is run in the course of 5 to 10 minutes into the deep-blue solution formed. The blue reaction solution is stirred for another 60 minutes at −70° C. under nitrogen. In the course of 20 minutes 40 g. of finely powdered, dry ammonium chloride are added portion-wise, whereupon the batch froths and the blue colour disappears. The ammonia is evaporated by allowing the batch to thaw gradually. The residue is taken up in ether and water; the separated ether extract is repeatedly washed with water, dried over sodium sulphate, filtered and evaporated. The residue is dissolved in 240 ml. of methanol, mixed with a solution of 24 g. of sodium pyrosulphite in 120 ml. of water and stirred for 15 minutes at 20–25° C., and then extracted with 4× 125 ml. of methylene chloride. The extracts are successively washed with 3× 75 ml. of water. The aqueous phase of the methylene chloride extraction and the 3 washings are combined and rendered alkaline to phenolphthalein with 80 ml. of concentrated sodium hydroxide solution. The batch is extracted with 4× 150 ml. of methylene chloride. The methylene chloride extracts are washed with 3× 125 ml. of water, dried over sodium sulphate, filtered, combined and evaporated. The residue is recrystallised from ether and yields 4.9 g. of 3-oxo-7$\alpha$-methyl-17$\beta$-hydroxy-5$\alpha$-androstane, melting at 174–177° C. Optical rotation $[\alpha]_D^{20°} = -25°$ (c.=1% in dioxane).

Example 3

12.0 g. $\Delta^1$-3-oxo-7$\alpha$-methyl-17$\beta$-hydroxy-5$\alpha$-androstene are dissolved in 150 ml. of dimethylformamide with stirring under nitrogen at 20–25° C. The cooled, clear solution is mixed at an internal temperature of 20–25° C. within 10–15 minutes with 10 g. of undecylenoyl chloride; for rinsing, another 50 ml. of dimethylformamide are used. The clear reaction solution is kept for 50 hours at 20–25° C. under nitrogen and, for working up, diluted successively with 100 ml. of water, whereupon the batch slightly heats up and the reaction product settles out in smeary form. The whole is kept for several hours at room temperature, extracted with 3× 500 ml. of ether, and the ether extract is successively washed with water, dilute sodium hydroxide solution containing a small amount of saturated sodium chloride solution, and finally with dilute sodium chloride solution. The washed ether extract is dried over sodium sulphate, filtered and evaporated. The residue is dissolved in hexane and chromatographed on alumina in hexane, eluted with hexane, and the resulting hexane fraction is concentrated until crystallisation sets in. The resulting $\Delta^1$-3-oxo-7$\alpha$-methyl - 17$\beta$ - hydroxy-5$\alpha$-androstene undecylenate crystallises in fine needles and melts at 30–35° C. $\lambda_{max}$. (in rectified spirit): 230 m$\mu$, $\epsilon$=10,400.

Example 4

A solution of 2.04 g. of 3-oxo-7$\alpha$:17$\alpha$-dimethyl-17$\beta$-hydroxy-19-nor-5$\alpha$-androstane in 60 ml. of methylene chloride is mixed at −15° C. with 2.6 g. of the adduct of 1 mol of bromine with pyridine-hydrobromide while rinsing with 5 ml. of methylene chloride. After stirring for 1 hour at −12° C., 50 mg. of para-toluenesulphonic acid are added and after another 25 minutes this operation is repeated. 25 minutes later the light-yellow reaction solution is mixed with a solution of 6 g. of sodium acetate in 60 ml. of water, and then twice washed with water. The aqueous solutions are further extracted twice with methylene chloride and the organic solutions are dried and evaporated under vacuum at a bath temperature of 30° C. The resulting crude 2-bromo-3-oxo-7$\alpha$:17$\alpha$-dimethyl-17$\beta$-hydroxy-19-nor-5$\alpha$-androstane is stirred with 60 ml. of dimethylformamide, 6 g. of lithium carbonate and 6 g. of lithium bromide under nitrogen at a bath temperature of 120° C. for 4 hours, then allowed to cool, mixed with water and 10 ml. of glacial acetic acid, and extracted three times with methylene chloride. The organic solutions are twice washed with water, dried, and evaporated under vacuum. To remove the last remnants of dimethylformamide, the residue is dissolved in xylene, evaporated under a water-jet vacuum, and this operation is repeated twice with benzene. The residue is chromatographed on 60 g. of alumina (activity II), and the crystalline fractions eluted with a 1:1-mixture of benzene+petroleum ether and with benzene are combined and chromatographed on 130 g. of florisil. Benzene and then a 99:1-mixture of benzene+ethyl acetate elutes at first 3-oxo-7$\alpha$-17$\alpha$ - dimethyl - 17$\beta$ - hydroxy - 19 - nor - 5$\alpha$ - androstane. The subsequent fractions eluted with benzene+ethyl acetate (99:1) contain $\Delta^1$ - 3 - oxo - 7$\alpha$:17$\alpha$ - dimethyl - 17$\beta$ - hydroxy-19-nor-5$\alpha$-androstene of which, after recrystallisation from ether+pentane, there are obtained 95° mg. melting at 150.5–151.5° C. Optical rotation $$[\alpha]_D^{20°} = +93°$$

(c.=0.500 in chloroform). $\lambda_{max}$ 230 m$\mu$, $\epsilon$=10,600. Infrared spectrum (in methylene chloride): 2.77$\mu$ (hydroxyl) and 5.96+6.22$\mu$ ($\Delta^1$-3-ketone).

Mixtures of benzene+ethyl acetate (19:1 and 9:1) elute $\Delta^4$ - 3 - oxo - 7$\alpha$:17$\alpha$ - dimethyl - 17$\beta$ - hydroxy - 19 - norandrostene.

The starting material is prepared in the following manner:

2× 400 mg. of lithium are stirred at an interval of 15 minutes into 400 ml. of ammonia. After another 15 minutes a solution of 4 g. of Δ⁴-3-oxo-7α:17α-dimethyl-17β-hydroxy-19-norandrostene in 40 ml. of dioxane and 40 ml. of ether is run in (rinsing with 10 ml. of ether). 20 minutes later another 400 mg. of lithium are added and after another 100 minutes 12 g. of ammonium chloride are added. The ammonia is allowed to evaporate from the colorless reaction mixture, and 200 ml. of benzene and 200 ml. of water are then added. The organic solution is washed three times with water, and the aqueous solutions are twice extracted with benzene. The residue of the dried organic solutions obtained by evaporation under vacuum is chromatographed on 120 g. of alumina (activity II). The fractions eluted with benzene:petroleum ether 1:1 and with benzene yield on recrystallisation from ether+pentane 1.92 g. of 3-oxo-7α:17α-dimethyl-17β-hydroxy-19-nor-5α-androstane melting at 104–106° C. Renewed chromatography of the mother liquor on alumina (activity II) yields a further 600 mg. of the identical compound. Optical rotation $[\alpha]_D^{20°} = +15°$ (c.=0.951 in chloroform). Infrared spectrum (solvent:methylene chloride): 2.77μ (hydroxyl) and 5.82μ (ketone).

Example 5

A solution of 500 mg. of the crude Δ¹-3β-hydroxy-7α-methyl-17-oxo-5α-androstene prepared as described below in 100 ml. of ether and 10 ml. of toluene is cooled to 0° C., saturated with acetylene, mixed (while being cooled) dropwise with 15 ml. of a 1.8 N-solution of sodium tertiary amylate in a mixture of tertiary amyl alcohol and toluene, whereupon for 15 hours a weak current of acetylene gas is passed through at 0–3° C. The reaction mixture is then poured into 100 ml. of an ammonium chloride solution of 20% strength, cooled to −5° C., and the whole is worked up in the usual manner, to yield 505 mg. of crude Δ¹-3β:17β-dihydroxy-7α-methyl-17α-ethinyl-5α-androstene.

A suspension of 210 mg. of the Δ¹-3β:17β-dihydroxy-7α-methyl-17α-ethinyl-5α-androstene in 20 ml. of absolute benzene is mixed with 250 mg. of aluminum tertiary butylate and 3 ml. of acetone and stirred for 18 hours at 25° C. with exclusion of moisture, then diluted with benzene, washed with dilute, ice-cold hydrochloric acid and water, and the benzene solution is dried and evaporated, to yield 195 mg. of a colorless crude product which on crystallisation furnishes 152 mg. of pure Δ¹-3-oxo-7α-methyl-17β-hydroxy-17α-ethinyl-5α-androstene. The ultraviolet spectrum of the compound contains a maximum at 231 mμ ( =10,400). Infrared spectrum (in methylene chloride): 2.76, 5.98 and 6.23μ.

The starting material is obtained as follows:

A solution of 1.0 g. of Δ¹-3-oxo-7α-methyl-17-ethylenedioxy-5α-androstene in 60 ml. of tetrahydrofuran is added to a stirred solution of tri-tertiary butoxy lithium aluminum hydride (prepared from 500 mg. of lithium aluminum hydride and a mixture of 3 ml. of tertiary butanol in tetrahydrofuran) in 50 ml. of tetrahydrofuran, and the resulting mixture is refluxed for 3 hours. Conventional processing yields 925 mg. of crude Δ¹-3β-hydroxy-7α-methyl-17-ethylenedioxy-5α-androstene which, without prior purification, is dissolved in 15 ml. of acetone, mixed with 100 mg. of para-toluenesulphonic acid and kept for 15 hours at 20° C. The reaction product is obtained by diluting the mixture with water, extraction with methylene chloride, washing the organic layer neutral and drying and evaporating it. Yield: 86% of crude Δ¹-3β-hydroxy-7α-methyl-17-oxo-5α-androstene which displays no selective absorption in the ultraviolet spectrum above 220 mμ. Its infrared spectrum displays bands, inter alia, at 2.76, 5.75 and 10.10μ.

Example 6

The following pharmaceutical preparations are made in a manner known per se:

1000 tablets for oral administration containing 5 mg. of Δ¹-3-oxo-7α,17α-dimethyl-17β-hydroxy-19-nor-5α-androstene Ingredients:

| | G. |
|---|---|
| Δ¹-3-oxo-7α,17α-dimethyl-17β-hydroxy-19-nor-5α-androstene | 5.00 |
| Lactose | 70.00 |
| Gelatine | 3.00 |
| Wheat starch | 40.00 |
| Arrowroot | 15.00 |
| Magnesium stearate | 0.70 |
| Talc | 6.30 |
| | 140.00 |

Procedure: The mixture of the active ingredient, lactose and wheat starch is moistened with a gelatin solution of 10% strength to form a slightly plastic mass and then granulated in the unual manner. After being dried at 40° C. the mass is brought into the usual grain size by being passed through a sieve. Magnesium stearate, arrowroot and talc are added to the dried mass and the mixture is then compressed into tablets of 7 mm. diameter.

1000 tablets for oral administration containing 5 mg. of Δ¹-3-oxo-7α-methyl-17α-ethinyl-17β-hydroxy-5α-androstene. The composition of the pharmaceutical carrier and the method of preparation is the same as in the preceding example.

1000 tablets for oral administration containing 1 mg. Δ¹-3-oxo-7α-methyl-17α-ethinyl-17β-hydroxy-19-nor-5α-androstene Ingredients:

| | G. |
|---|---|
| Δ¹-3-oxo-7α-methyl-17α-ethinyl-17β-hydroxy 19-nor-5α-androstene | 1.00 |
| Lactose | 53.00 |
| Gelatine | 1.00 |
| Wheat starch | 39.50 |
| Magnesium stearate | 0.30 |
| Talc | 5.20 |
| | 100.00 |

Preparation: analogous to that described above 100 oil ampoules each containing 10 mg./ml. of Δ¹-3-oxo-7α-methyl-17β-undecenoyloxy-5α-androstene.

Ingredients:

| Δ¹-3-oxo-7α-methyl-17β-undecenoyloxy-5α-androstene | g. | 1 |
| Benzyl alcohol | ml. | 10 |
| Sesame oil | ml. | 90 |

The active ingredient is dissolved in pure benzyl alcohol and the stirred solution diluted with hot sterilized sesame oil. 1 ml. of this solution containing the ingredients in the above given amounts is filled in ampoules which are sterilized at 160° C. for 1.5 hours.

What is claimed is:
1. A compound of the formula

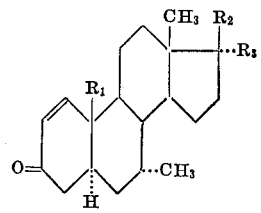

wherein $R_1$ is a member selected from the group consisting of a hydrogen atom and a methyl group, $R_2$ a member selected from the group consisting of a free and an esterified hydroxyl group, $R_3$ a member selected from the group consisting of a hydrogen atom, a lower alkyl, halogenated lower alkyl, lower alkenyl, halogenated lower alkenyl, lower alkinyl and halogenated lower alkinyl radical, $R_2$ and $R_3$ taken together a member selected from the group consisting of a free and a ketalized oxo group, said esterified hydroxyl groups being derived from carboxylic acids selected from the group consisting of aliphatic, alicyclic, araliphatic and heterocyclic carboxylic acids with 1 to 18 carbon atoms.

2. A compound as claimed in claim 1, wherein each of $R_1$ and $R_3$ stands for methyl and $R_2$ is a free hydroxyl group.

3. A compound as claimed in claim 1, wherein $R_1$ is methyl, $R_2$ stands for a free hydroxyl group and $R_3$ is hydrogen.

4. A compound as claimed in claim 1, wherein $R_1$ is hydrogen, $R_2$ stands for a free hydroxyl group and $R_3$ is methyl.

5. A compound as claimed in claim 1, wherein $R_1$ is methyl, $R_2$ stands for a free hydroxyl group and $R_3$ for the ethinyl group.

6. A compound as claimed in claim 1, wherein $R_1$ is hydrogen, $R_2$ stands for a free hydroxyl group and $R_3$ for the ethinyl group.

7. A compound as claimed in claim 1, wherein $R_1$ is hydrogen, $R_2$ stands for a free hydroxy group and $R_3$ for the propinyl group.

8. A compound as claimed in claim 1, wherein $R_1$ is hydrogen, $R_2$ stands for a free hydroxyl group and $R_3$ for the ethyl group.

9. A compound as claimed in claim 1, wherein $R_1$ is methyl, $R_2$ stands for a undecenoyloxy group and $R_3$ for hydrogen.

References Cited

UNITED STATES PATENTS

| | | | |
|---|---|---|---|
| 3,002,005 | 9/1961 | Campbell et al. | 260—397.3 |
| 3,007,947 | 11/1961 | Counsell | 260—397.4 |

FOREIGN PATENTS

| | | |
|---|---|---|
| 750,834 | 6/1956 | Great Britain. |

OTHER REFERENCES

Campbell et al.: Steroids, vol. 1, No. 3, March 1963, pp. 317–324.

HENRY A. FRENCH, *Primary Examiner.*

U.S. Cl. X.R.

260—239.5, 239.55, 397.3, 397.5; 424—243